United States Patent
Yakabe

(10) Patent No.: US 12,460,085 B2
(45) Date of Patent: Nov. 4, 2025

(54) COATED MEMBER MANUFACTURING METHOD AND COATED MEMBER

(71) Applicant: Proterial, Ltd., Tokyo (JP)

(72) Inventor: Hidetaka Yakabe, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 18/293,334

(22) PCT Filed: Aug. 8, 2022

(86) PCT No.: PCT/JP2022/030350
§ 371 (c)(1),
(2) Date: Jan. 29, 2024

(87) PCT Pub. No.: WO2023/032613
PCT Pub. Date: Mar. 9, 2023

(65) Prior Publication Data
US 2024/0247146 A1    Jul. 25, 2024

(30) Foreign Application Priority Data
Aug. 30, 2021 (JP) ................. 2021-140467

(51) Int. Cl.
C09D 1/00 (2006.01)
B05D 1/18 (2006.01)
B05D 3/02 (2006.01)
C01F 5/08 (2006.01)

(52) U.S. Cl.
CPC ............. *C09D 1/00* (2013.01); *B05D 1/18* (2013.01); *B05D 3/0254* (2013.01); *C01F 5/08* (2013.01)

(58) Field of Classification Search
None
See application file for complete search history.

(56) References Cited

U.S. PATENT DOCUMENTS

2020/0299820 A1    9/2020  Volbers

FOREIGN PATENT DOCUMENTS

| CN | 111302366 | 6/2020 |
|---|---|---|
| JP | H07278827 | 10/1995 |
| JP | 2005332930 | 12/2005 |
| JP | 2012521649 | * 9/2012 |
| WO | 2020067719 | 4/2020 |
| WO | 2021065485 | 4/2021 |
| WO | 2021065486 | 4/2021 |

OTHER PUBLICATIONS

"Search Report of Europe Counterpart Application", issued on Apr. 18, 2024, p. 1-p. 7.
"International Search Report (Form PCT/ISA/210) of PCT/JP2022/030350", mailed on Oct. 18, 2022, with English translation thereof, pp. 1-4.

* cited by examiner

*Primary Examiner* — Nathan T Leong
(74) *Attorney, Agent, or Firm* — JCIPRNET

(57) ABSTRACT

A coated member manufacturing method includes: an application step for applying a magnesium hydroxide solution on a surface of a Fe—Co-based alloy base material; and a baking step for baking the base material after the application step at 600-900° C. to form a magnesium oxide coating on the base material. This coated member has, on a Fe—Co-based alloy base material, a baked coating of magnesium oxide having a lattice constant of 4.20-4.23 Å.

1 Claim, No Drawings

COATED MEMBER MANUFACTURING METHOD AND COATED MEMBER

CROSS-REFERENCE TO RELATED APPLICATION

This application is a 371 application of the International PCT application serial no. PCT/JP2022/030350, filed on Aug. 8, 2022, which claims the priority benefits of Japan Patent Application No. 2021-140467, filed on Aug. 30, 2021. The entirety of each of the above-mentioned patent applications is hereby incorporated by reference herein and made a part of this specification.

TECHNICAL FIELD

The present invention relates to a coated member manufacturing method and a coated member.

BACKGROUND ART

Due to the growing environmental preservation awareness in recent years, attempts for the electrification of automobiles or the hybridization of aircraft are becoming more active and an increase in output, a decrease in size and a decrease in loss in electric motors can be exemplified as the underlying technology therefor. As the shape of a motor core that is used for these electric motors, a laminated core having a structure in which a large number of soft magnetic alloy thin films are laminated together is in use since the quantity of magnetization per unit volume is large and the laminated core is advantageous in reducing the sizes of cores.

As a method for further decreasing the size of this laminated core, the application of a soft magnetic material having a high saturation magnetic flux density is effective, and, as a method for further decreasing the loss, improvement in the electrical insulating properties (hereinafter, also simply referred to as the electrical insulation) between laminated single plates is effective. For example, Patent Literature 1 discloses a laminated core in which permendur (Fe—Co-based alloy) single layer materials having a high saturation magnetic flux density are laminated together and proposes the formation of a ceramic layer of magnesium oxide, zirconium oxide, aluminum oxide or the like on the surface of the single layer material as an insulating coating. In addition, Patent Literature 2 discloses that a two-stage thermal treatment is performed on a cold-rolled Fe—Co-based alloy material and a laminated core is produced from the thermally treated alloy material and also describes that a magnesium oxide coating is formed by a thermal treatment to prevent the melt-adhesion of the alloy material.

RELATED ART LITERATURE

Patent Literature

Patent Literature 1: Japanese Translation of PCT Application No. 2012-521649
Patent Literature 2: Specification of U.S. Patent Application Publication No. 2020/0299820

SUMMARY OF INVENTION

Problem to be Solved by Invention

The laminated core in which permendur coated with the ceramic layer is laminated, which is disclosed in Patent Literature 1 or Patent Literature 2, has excellent electrical insulation. Incidentally, Patent Literature 1 discloses a method in which the surface of the permendur single layer material coated with the ceramic layer (hereinafter, also referred to as a coated member) is processed by electric discharge processing, but it was confirmed by the present inventors' studies that an insulating layer discolors at the time of performing the electric discharge machining on the coated member. This discoloration arises from the elution of the ceramic layer, which is an insulating layer, and there is a concern that it may not be possible to secure the electrical insulation and this discoloration may lead to an increase in the loss of the laminated core. Such a problem is not recognized in Patent Literature 1 or Patent Literature 2, and there is a room for studies. In addition, as a problem that is caused in laminated cores, melt-adhesion between single layer materials can be exemplified. This melt-adhesion occurs during magnetic annealing and causes a significant increase in iron loss. In addition, the shapes of the single layer materials become poor at the time of peeling off the welded single layer materials, and there is a concern of the accompanying deterioration of the magnetic characteristics, and there is thus a need to suppress the occurrence of melt-adhesion. Therefore, an objective of the present invention is to provide a coated member that maintains electrical insulation even when the shape is processed by electric discharge processing and that can also suppress melt-adhesion when being laminated and thermally treated and a manufacturing method thereof.

Means for Solving Problem

The present inventors found that, in a case where the baking temperature is not appropriate, the lattices configuring magnesium oxide become unstable and considered that the elution of a coating is caused due to that instability. In addition, the present inventors intensively studied an appropriate baking temperature and reached the present invention.

That is, an aspect of the present invention is a coated member manufacturing method having an application step for applying a magnesium hydroxide solution onto a surface of a Fe—Co-based alloy base material; and a baking step for baking the base material after the application step at 600-900° C. to form a magnesium oxide coating on the base material.

In addition, another aspect of the present invention is a coated member having, on a Fe—Co-based alloy base material, a baked coating of magnesium oxide having a lattice constant of 4.20-4.23 Å.

Effects of Invention

According to the present invention, it is possible to provide a coated member that maintains electrical insulation even when electric discharge processing is performed thereon and that can also suppress melt-adhesion when being laminated and thermally treated.

DESCRIPTION OF EMBODIMENTS

First, a coated member manufacturing method of the present invention will be described. In the present invention, a Fe—Co-based alloy base material is used as a base material that is to be a soft magnetic material. An Fe—Co-based alloy in the present invention refers to an alloy material containing, by mass %, 95% or more of Fe and Co and 25-60% of Co. This makes it possible for the Fe—Co-based alloy to exhibit a high magnetic flux density.

Next, elements that may be contained in the Fe—Co-based alloy of the present invention will be described. The Fe—Co-based alloy of the present invention may contain one or more elements of V. Si, Mn, Al, Zr, B, Ni, Ta, Nb, W, Ti, Mo and Cr up to a maximum of 5.0% in total, by mass %, to improve magnetic characteristics or cold workability. Additionally, examples of impurity elements that are inevitably contained include C. S. P and O, and the upper limit of each is preferably set to, for example, 0.1%.

In the coated member manufacturing method of the present invention, first, an application step for applying a solution containing magnesium hydroxide (hereinafter, also expressed as $Mg(OH)_2$) is performed to form a coating composed of magnesium oxide (hereinafter, also expressed as MgO) on the surface of the Fe—Co-based alloy base material. The reason for selecting the MgO coating is that MgO is excellent in terms of electrical insulating properties or adhesiveness to the Fe—Co-based alloy, which is the base material. In addition, when magnetic annealing is performed on a coated member to obtain desired magnetic characteristics, an insulating film is exposed to a reducing atmosphere of hydrogen or the like (approximately 850° C.), but MgO is not easily reduced by hydrogen and does not easily evaporate even at high temperatures, and characteristic deterioration caused by heat diffusion is also less likely to occur, and thus MgO is also excellent in terms of electrical insulation and melt-adhesion resistance.

In the present invention, as a coating liquid for forming the above-described coating composed of MgO, a $Mg(OH)_2$ solution in which a $Mg(OH)_2$ powder, which acts as a precursor of MgO, is used as a solute and dispersed in a solvent (hereinafter, also referred to as a slurry) is used. The use of this slurry as the coating liquid makes it possible to apply the slurry uniformly onto the metal base material surface in a stable film thickness. $Mg(OH)_2$ that is used as the solute of the slurry thermally decomposes and turns into MgO when heated and is thus capable of easily forming the MgO coating. In addition, since the thermal decomposition temperature of $Mg(OH)_2$ is as low as approximately 500° C., it is possible to stably form the MgO coating at low temperatures. Here, as another precursor other than $Mg(OH)_2$, magnesium carbonate ($MgCO_2$) can also be used. In addition, as the solvent of the slurry, an amphoteric solvent such as water or an alcohol and an organic solvent can be used. As a method for applying the slurry onto the metal base material, roll coating in which the slurry is smeared on the base material with a roller, dip coating in which the base material is immersed in the slurry and lifted or screen printing can be used.

In the present invention, after the application step, a baking step for baking the slurry-applied base material at 600-900° C. to form a MgO coating on the base material (hereinafter, the step for thermally decomposing the precursor to form a MgO coating will also be simply referred to as "baking") is performed.

During electric discharge processing that is used as a shape-processing method for producing a laminated core, a work material is processed in water, but there is a tendency that the elution of the MgO coating occurs at that time, and this elution makes the film thickness of the MgO coating be thin, whereby there is a concern that it may not be possible to secure electrical insulating properties. In the present invention, the baking temperature of $Mg(OH)_2$ is set to 600-900° C., whereby the elution of the MgO coating that occurs at the time of performing electric discharge processing on the coated member is suppressed, and a MgO coating having excellent electrical insulation and excellent melt-adhesion resistance can be formed. One of the reasons that this elution-suppressing effect of the present invention can be obtained is considered to be improvement in the stability of the lattices configuring the MgO coating by the appropriate baking temperature. In a case where the baking temperature is lower than 600° C., the elution of the MgO coating occurs. In addition, in a case where the baking temperature exceeds 900° C., fine crystal grains are precipitated due to the precipitation of a gamma phase in the grain boundaries in the Fe—Co-based metal base material, these fine crystal grains impair domain wall motion to increase the coercive force, and there is a possibility that the soft magnetic characteristics may deteriorate. The upper limit of the baking temperature is preferably 850° C., more preferably 800° C. and still more preferably 700° C. The above-described elution of the MgO coating appears as color unevenness and can also be easily observed from the outside appearance of the coated member.

The baking time in the baking step of the present invention may be set as appropriate in consideration of the relationship with the baking temperature to an extent that the effect of the present invention is not impaired, and the baking time can be shortened if the baking temperature is high. For example, in a case where the baking temperature is set to 600° C., the baking temperature can be set to 1-30 minutes. In addition, when the temperature rise rate in the baking step is set to 200° C./h-300° C./h, there is a tendency that the stability of the lattices configuring the MgO coating can be improved, which is preferable. Furthermore, cooling is preferably performed by furnace cooling, and it is preferable to apply slow cooling for 90-180 minutes from the baking temperature to room temperature. In addition, the atmosphere during the baking is preferably an inert gas atmosphere or a vacuum atmosphere. This is to prevent the following deterioration: in a case where baking is performed in the atmosphere, the coated member is excessively oxidized, and even the Fe—Co-based metal base material is oxidized, whereby the soft magnetic characteristics of the Fe—Co-based metal base material deteriorate. As the inert gas atmosphere, there is, for example, a nitrogen gas atmosphere or an Ar gas atmosphere.

In the present invention, the baking is performed after the slurry is applied to the surface of the metal base material, but a drying step of evaporating the solvent before the baking may be provided. Since the drying step is performed at a low temperature near the boiling point of the solvent, it becomes possible to rapidly dry the slurry to suppress dripping or form a coated film in a uniform film thickness. In addition, the drying step can be performed at a low temperature and can be thus performed in the atmosphere, which is an advantage.

A coated member of the present invention obtained by the above-described manufacturing method of the present invention has a magnesium oxide baked coating having a lattice constant of 4.20-4.23 Å on a base material. The lattice constant of MgO approaches 4.213 Å, which is the theoretical value, whereby there is a tendency that it is possible to suppress the elution of MgO coating after the electric discharge processing. The reason therefor is considered as described below. $Mg(OH)_2$, which is the precursor of MgO, has a hexagonal system, but MgO that is formed by the baking has a cubic system. In the present invention, MgO is generated by the thermal decomposition reaction of $Mg(OH)_2$ in the baking step; however, for example, in a case where the baking temperature is as low as 500° C., the thermal decomposition reaction does not sufficiently progress, and thus MgO having a larger lattice constant than the theoretical value is generated. Since this MgO having a large lattice constant is likely to be eluted in water, the electric discharge processing in water causes color unevenness. Here, the lattice constant of MgO can be measured by the X-ray diffraction method. Whether or not the coating of the present invention is a baked coating formed by the application of a solution and baking can be determined from the cross-sectional photograph of the coating (for example, a cross-sectional photograph of the coating observed with a transmission electron microscope at a magnification of 1,000,000 times). That is, in a baked coating, pores having an equivalent area diameter of approximately 10-50 nm are observed in the coating structure, but the pores are not observed in a coating formed by the physical vapor deposition method, and the baked coating can thus be specified from this difference.

In addition, the film thickness of the coating formed in the coated member may be set to an extent that the electrical insulating properties can be secured. The electrical insulating properties improve when the coating is made to be thick; however, when the coating is made to be excessively thick, there is a concern that the space factor of a laminated core may decrease and characteristic deterioration may be caused, and the film thickness thus needs to be set in consideration of the electrical insulation and the space factor. For example, the film thickness is preferably 10-1000 nm.

EXAMPLES

Example 1

As metal base materials, three cold-rolled materials (110 mm in length, 60 mm in width and 0.2 mm in plate thickness) of a Fe—Co-based alloy having a composition shown in Table 1 were prepared, and alkaline degreasing was performed thereon. Next, a slurry was prepared by dispersing a $Mg(OH)_2$ powder, which was a solute, in water, which was a solvent, and the slurry was applied onto the base materials by a dip coating method. The base materials onto which the slurry had been applied were dried by being heated at 100° C. for five minutes in the atmosphere.

Present Invention Example 1

A baking step was performed by heating a dried base material in a nitrogen atmosphere at a temperature rise rate of 250° C./h until 600° C. was reached, holding the base material at 600° C. for 30 minutes and then cooling the base material in the furnace to room temperature for 160 minutes, whereby a coated member of Present Invention Example 1 coated with the MgO coating having a film thickness of 0.1 μm was produced.

Present Invention Example 2

A baking step was performed by heating a dried base material in a nitrogen atmosphere at a temperature rise rate of 250° C./h until 700° C. was reached, holding the base material at 700° C. for 30 minutes and then cooling the base material in the furnace to room temperature for 170 minutes, whereby a coated member of Present Invention Example 2 coated with the MgO coating having a film thickness of 0.1 μm was produced.

Comparative Example 1

A baking step was performed by heating a dried base material in a nitrogen atmosphere at a temperature rise rate of 250° C./h until 500° C. was reached, holding the base material at 500° C. for 30 minutes and then cooling the base material in the furnace to room temperature for 150 minutes, whereby a coated member of Comparative Example 1 coated with the MgO coating having a film thickness of 0.1 μm was produced.

TABLE 1

| | | | | | | (mass %) |
|---|---|---|---|---|---|---|
| C | Si | Mn | Co | V | Remainder | |
| 0.002 | 0.03 | 0.04 | 49.07 | 1.91 | Fe and inevitable impurity | |

After each of the coated members produced above was processed into a ring-shaped sample having an outer diameter of 45 mm and an inner diameter of 33 mm by electric discharge processing, the presence or absence of color unevenness was visually determined. In addition, as the evaluation of the lattice constant, the lattice constant a of the MgO coating formed on the surface of the metal base material was obtained by a thin film method using an X-ray diffractometer RINT 2500V manufactured by Rigaku Corporation and CoKα as a radiation source. The results are shown in Table 2. The results of Table 2 show that, in the coated member of Comparative Example 1, the lattice constant a of the MgO coating was larger than those in the present invention examples and color unevenness was caused after the electric discharge processing. In contrast, it was possible to confirm that, in the coated members of Present Invention Examples 1 and 2, the lattice constants a of MgO were close to the theoretical value and color unevenness was not caused in both samples.

TABLE 2

| | Baking temperature (° C.) | Presence or absence of color unevenness | Lattice constant a of MgO (Å) |
|---|---|---|---|
| Present Invention Example 1 | 600 | Absent | 4.219 |
| Present Invention Example 2 | 700 | Absent | 4.214 |
| Comparative Example 1 | 500 | Present | 4.264 |

Example 2

Subsequently, the melt-adhesion resistance of the coated member of the present invention was confirmed. Two cold-rolled materials of the Fe—Co-based alloy having the composition shown in Table 1 of Example 1 that were 50 mm in length, 50 mm in width and 0.2 mm in plate thickness (A base materials) and, similarly, two cold-rolled materials of the Fe—Co-based alloy having the composition shown in Table 1 of Example 1 that were 40 mm in length, 50 mm in width and 0.2 mm in plate thickness (B base materials) were prepared.

Present Invention Example 3

A MgO coating was formed on both the A base material and the B base material under the same conditions as in Present Invention Example 1 of Example 1 to produce coated members A and B. Subsequently, the coated members were overlapped each other so that the coated member B did not protrude from the coated member A, and the overlapped coated members were pinched between alumina plates and heated in a thermal treatment furnace at 850° C. for three hours, thereby producing a sample of Present Invention Example 3. The surface pressure that was applied to the coated members A and B at this time was 0.1 g/cm².

Comparative Example 2

A sample of Comparative Example 2 was produced under the same conditions as in Present Invention Example 3 except that the A base material and the B base material were overlapped together without performing coating thereon.

As a result of observing the samples after the heating, it was confirmed that, in Comparative Example 2, melt-adhesion occurred and the A base material and the B base material adhered to each other. On the other hand, in Present Invention Example 3, no melt-adhesion occurred after the heating. In addition, these results were still the same even when the experiment was performed by changing the surface pressure that was applied to the coated members A and B to 0.075 g/cm². It was possible to confirm from the above-described results that, even when the coated members of the present invention are laminated together and magnetic annealing is performed thereon, melt-adhesion does not occur, and the coated member is suitable for a laminate core use.

Example 3

In order to confirm the influence of the baking temperature on the soft magnetic characteristics of the Fe—Co-based alloy, evaluation was performed using a cold-rolled material of the Fe—Co-based alloy not coated with MgO. As a metal base material, a cold-rolled material having a plate thickness of 0.2 mm of a Fe—Co-based alloy having a composition shown in Table 3 was prepared, and a ring-shaped sample having an outer diameter of 45 mm and an inner diameter of 33 mm was prepared by electric discharge processing. Subsequently, a thermal treatment simulating baking was performed by heating the sample at a temperature rise rate of 250° C./h in a nitrogen atmosphere, holding the sample at 700° C. for 30 minutes and then cooling the sample in the furnace to room temperature for 120 minutes, and magnetic annealing was then performed in a hydrogen atmosphere at 850° C. for three hours, thereby obtaining a sample of Present Invention Example 4. In addition, the shape of the sample and the processing method of the ring-shaped sample were set in the same manner, a thermal treatment simulating baking was performed by heating the sample at a temperature rise rate of 250° C./h in a nitrogen atmosphere, holding the sample at 950° C. for 30 minutes and then cooling the sample in the furnace to room temperature for 180 minutes, and magnetic annealing was then performed in a hydrogen atmosphere at 850° C. for three hours, thereby obtaining a sample of Comparative Example 3. The number of the ring-shaped samples produced in each of the present invention example and the comparative example was five.

TABLE 3

| | | | | | (mass %) |
|---|---|---|---|---|---|
| C | Si | Mn | Co | V | Remainder |
| 0.001 | 0.04 | 0.05 | 48.92 | 1.89 | Fe and inevitable impurity |

Subsequently, as magnetic characteristic evaluation, five ring-shaped samples of each of Present Invention Example 4 and Comparative Example 3 were overlapped together, primarily wound 100 times and secondarily wound 50 times. In addition, a DC magnetic field of 5000 A/m was applied to the ring-shaped samples, and the coercive force $H_c$ and the maximum relative permeability μm were measured. The results are shown in Table 4. Table 4 shows that the sample of Present Invention Example 4 had a small He and a large μm and thus had excellent soft magnetic characteristics. On the other hand, it is clear that the sample of Comparative Example 3 had a large $H_c$ and a small μm and thus the soft magnetic characteristics deteriorated. It was possible to confirm from the above-described results that baking at a temperature of higher than 900° C. makes the soft magnetic characteristics of the Fe—Co-based alloy deteriorate and such a temperature is not suitable as the baking temperature.

TABLE 4

| | Thermal treatment temperature (° C.) | Coercive force $H_c$ (A/m) | Maximum relative permeability ($\mu_m$) |
|---|---|---|---|
| Present Invention Example 4 | 700 | 31.2 | 25000 |
| Comparative Example 3 | 950 | 121.5 | 5600 |

The invention claimed is:

1. A coated member manufacturing method comprising:
   an application step for applying a magnesium hydroxide solution onto a surface of a Fe—Co-based alloy base material; and
   a baking step for baking the base material after the application step at 600-900° C. to form a magnesium oxide coating on the base material.

* * * * *